United States Patent
Cotterchio et al.

(10) Patent No.: US 7,151,714 B2
(45) Date of Patent: Dec. 19, 2006

(54) APPARATUS FOR MEASURING THE INSTANTANEOUS DISTANCE BETWEEN THE STERN OF A VESSEL AND A FIXED STRUCTURE SUCH AS QUAY, A JETTY OR A LANDING STAGE

(75) Inventors: Massimiliano Cotterchio, Susa (IT); Giacomo Negro, Santena (IT); Simone Bruckner, Viareggio (IT)

(73) Assignee: Azimut-Benetti S.p.A., Viareggio (IT)

( * ) Notice: Subject to any disclaimer, the term of this patent is extended or adjusted under 35 U.S.C. 154(b) by 131 days.

(21) Appl. No.: 10/788,664

(22) Filed: Feb. 27, 2004

(65) Prior Publication Data
US 2004/0221468 A1 Nov. 11, 2004

(30) Foreign Application Priority Data
Mar. 3, 2003 (IT) .......................... TO2003A0149

(51) Int. Cl.
*G01S 15/93* (2006.01)
*G01S 15/88* (2006.01)

(52) U.S. Cl. .......................... 367/99; 367/103; 367/909

(58) Field of Classification Search ................. 367/87, 367/99, 103, 112, 909; 340/435, 436
See application file for complete search history.

(56) References Cited

U.S. PATENT DOCUMENTS 4,500,977 A * 2/1985 Gelhard ...................... 367/909
5,515,341 A * 5/1996 Toda et al. ................. 340/435
6,421,299 B1 7/2002 Betts et al.

FOREIGN PATENT DOCUMENTS

| GB | 2 317 316 A | 3/1998 |
| JP | 2000-258524 A | 9/2000 |
| WO | 94/01944 | 1/1994 |
| WO | 98/00730 | 1/1998 |
| WO | 01/11384 A1 | 2/2001 |

* cited by examiner

*Primary Examiner*—Ian J. Lobo
(74) *Attorney, Agent, or Firm*—Merchant & Gould P.C.

(57) ABSTRACT

The apparatus includes transmitter-receiver units (10, 20) for emitting acoustic signals in the form of beams (F1, F2) directed rearwardly of the stern and for receiving acoustic signals reflected by the fixed structure (B, C). The number of transmitter-receivers and the beam angles of the respective beams are determined so as to include substantially the entire area behind the stern in their field of view. Each transmitter-receiver includes a transducer for converting input electrical signals into output acoustic signals and for converting reflected acoustic signals into output electrical signals which are supplied to an electronic processor unit.

On the basis of electrical input and output signals, the processor unit determines the instantaneous distance between the vessel and the fixed structure. A visual and/or acoustic signalling device is connected to the processor unit for emitting a visual and/or acoustic signal in real time indicating the instantaneous distance determined.

12 Claims, 3 Drawing Sheets

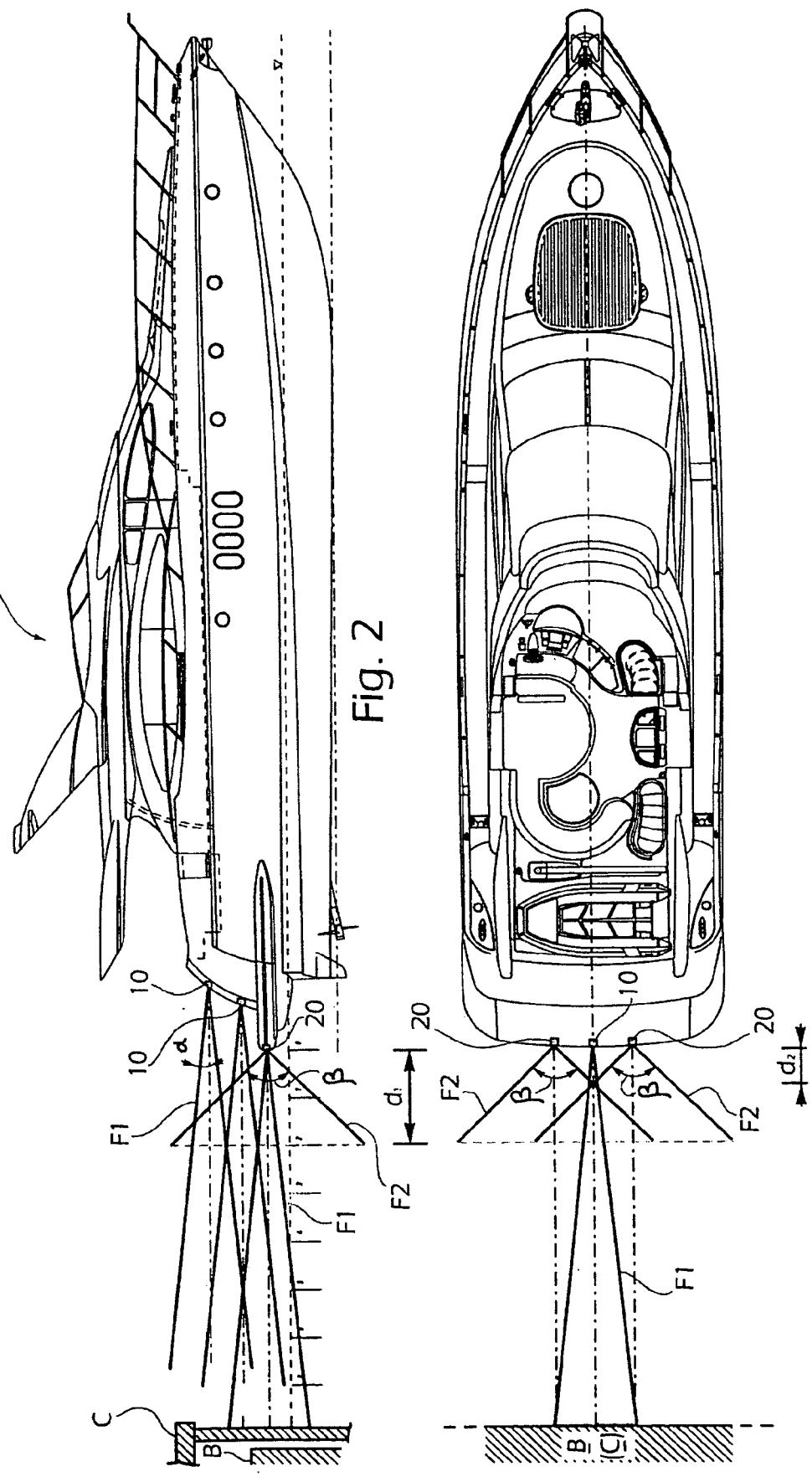

APPARATUS FOR MEASURING THE INSTANTANEOUS DISTANCE BETWEEN THE STERN OF A VESSEL AND A FIXED STRUCTURE SUCH AS QUAY, A JETTY OR A LANDING STAGE

DESCRIPTION

The present invention relates to apparatus for measuring the instantaneous distance between the stern of a vessel and a fixed structure such as a quay, a jetty or a landing stage. In particular, the invention is intended to be applied to yachts with a wheel position or control cabin situated in a part of the vessel from which the skipper does not have a clear rearward view beyond the stern. A typical example would be a yacht which also has a wheel on a flying bridge, that is at the level of the roof of the wheel cabin.

A general object of the present invention is to provide distance-measuring apparatus for fitting on vessels in order to make it easier and safer to approach and moor alongside a fixed structure.

A particular object of the invention is to provide versatile measuring apparatus which works effectively with any structural type of quay, jetty or landing stage, that is either with raised structures or with structures only slightly higher than the water level.

These and other objects, which will be better understood later, are achieved according to the invention by providing apparatus having the features defined in the appended claims.

A few preferred but non-limitative embodiments of the invention will now be described with reference to the appended drawings, in which:

FIG. 1 is a side elevation view of a vessel equipped with an apparatus according to the invention;

FIG. 2 is a view from above of the vessel of FIG. 1;

With reference initially to FIGS. 1 and 2, a plurality of rearward facing transmitter-receivers 10, 20 are mounted on the stern area of a vessel A, each emitting acoustic signals, preferably at a frequency in the region of 35–225 kHz, for example of around 50 kHz. In the present description and in the Claims which follow, terms and expressions indicating positions or orientations should be understood as referring to the condition installed on the vessel and to its forward movement, unless specified otherwise.

In the vicinity of a fixed obstacle, such as a quay or jetty B or landing stage C, an acoustic signal emitted by any one of the units is reflected by the obstacle. The reflected signal is detected by the same unit and forwarded to a signal processor which calculates the time interval between the instant of transmission to the first instant of receiving the reflected signal and provides a signal indicating the instantaneous distance measured between the vessel and the fixed obstacle.

Figure 3:
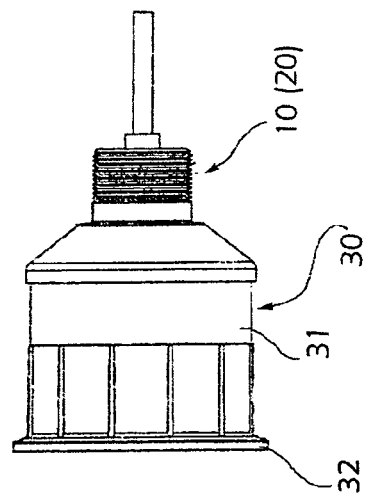
FIG. 3 is a view from above of a transmitter-receiver unit forming part of the apparatus of the invention.

The transmitter-receivers 10, 20 are preferably of a horn-shaped type such as that shown in FIG. 3. Each unit is housed in a respective casing 30 of a rubber-based or plastics material which forms a cylindrical portion 31 open to the rear and an external rear flange 32.

In the preferred embodiment of the invention, two different types of transmitter-receiver are used together:

a first type of distance or long-range transmitter-receivers 10 which emit first output signals as directional beams F1 with a narrower beam angle $\alpha$, of around 8–20° for example, preferably of around 12°, and a long range, of around 8–15 m for example, and a second type of short-range transmitter-receivers 20 which emit output signals in the form of beams F2 with a wider beam angle $\beta$, greater than 20° (for example about 90°) and a short range, for example of 1–2 m.

As shown in FIGS. 1 and 2, a plurality of long range transmitter-receiver units 10, in this instance three, are mounted on the stern of the vessel, aligned in a longitudinal vertical plane, in this example along a median plane, so as to direct a corresponding plurality of first conical beams F1 rearwardly along axes which are substantially horizontal and parallel to one another in a longitudinal vertical plane passing through the centre line of the vessel.

The range of the first beams F1 is such that the respective units 10 are able to detect the presence of any fixed structure, either a quay B or a landing stage C extending up to around 2–2.5 meters above the water level.

A plurality of short-range transmitter-receivers 20, two in this instance, are mounted on the stern of the vessel, aligned in a horizontal plane, so as to direct rearwardly a corresponding plurality of second conical beams F2 having axes which are substantially horizontal and parallel to one another in a substantially horizontal plane, preferably at an ideal height of around 30–50 cm above the waterline.

Fitted to the vessel is an electronic control processing unit provided with software for managing the transmitter-receivers and for the acquisition and processing of data (in a manner which will be illustrated later) and instruments emitting visual and/or acoustic signals for alerting the operator in real time to the results. The instruments preferably include a display and acoustic signalling means (not shown), arranged by the wheel.

Manufacturing and operating characteristics of the transmitter-receiver units used (which could, for example, be of the type currently used in sonar apparatus) are known per se and will therefore not be described in detail. Suffice it here to say that each transmitter-receiver device includes a first transducer operable to convert incoming electrical signals supplied by the central processor unit into acoustic signals and a second transducer (which could possibly coincide with the first) operable to convert reflected acoustic signals into electrical output signals to supply to the central processing unit. This latter processes the received electrical signals so as to obtain and display distance data in real time, as described earlier.

When the vessel A carries out an approaching manoeuvre in order to dock with a fixed structure (a quay B or landing stage C), the apparatus is activated, preferably automatically by selection of reverse gear. The transmitter-receiver units 10, 20 are activated alternately and cyclically to emit respective beams F1, F2. As soon as the fixed structure B or C is within range of the long-range transmitter-receivers 10, these units measure signals from the beams F1 reflected by the fixed structure. The electronic control processor unit processes the reflected signals and calculates instantaneous distance data which is displayed (on a screen) and/or announced acoustically. When the vessel is near enough to the fixed structure that it is within range of the short-range transmitter-receivers 20, these units also detect signals from their own beams F2 reflected by the fixed structure.

Once at a predetermined minimum distance from the fixed structure, of around 1 m for example, the apparatus automatically issues a warning sound indicating that this minimum safety distance has been reached. The acoustic indicator stops automatically as soon as the vessel moves more than 1 m (or any other predetermined distance) away from the fixed structure, or when reverse gear is de-selected, at the end of the manoeuvre. In addition, a special push button could be provided to switch off the acoustic signal voluntarily. This de-activation is preferably only allowed when the acoustic signal is active, and in any case it will be automatically re-activated as soon as reverse is selected again.

As will be appreciated, the combination and the arrangement of long-range transmitter-receivers 10 and short-range transmitter-receivers 20 makes it possible to scan completely the space behind the vessel and to measure the instantaneous distance from any type of quay, jetty or landing stage. The short-range transmitter-receivers 20 are spaced laterally and emit beams F2 with beam angles β such as to include in their field of view substantially all the area immediately behind the stern. In particular, with their wide beam angles, the units 20 are effective at detecting structural elements such as the pillars of a landing stage which could be missed at less than a certain distance if only the long-range-type transmitter-receivers 10 were being used, the beams F1 of which begin to intersect at a distance $d_1$ from the vessel greater than the distance $d_2$ at which the beams F2 start to intersect.

It should be noted that the choice of arranging the various transmitter-receivers in the configuration illustrated in FIGS. 1 and 2, as well as the adoption of two different types of transmitter-receivers 10, 20, constitutes a preferential choice for applications under certain conditions, but is certainly not imperative to the implementation of the invention. In particular, the apparatus lends itself to being arranged with the transmitter-receivers positioned differently, as shown for example in the variant illustrated in FIG. 5, or according to yet other configurations, preferably but not necessarily symmetrical in relation to a longitudinal vertical plane passing through the centre line of the vessel. For example, the number and the positioning of the transmitter-receivers, the distances between them and the beam angles of the beams F1, F2 could vary in dependence on requirements and on the dimensions of the vessel.

Figure 5:
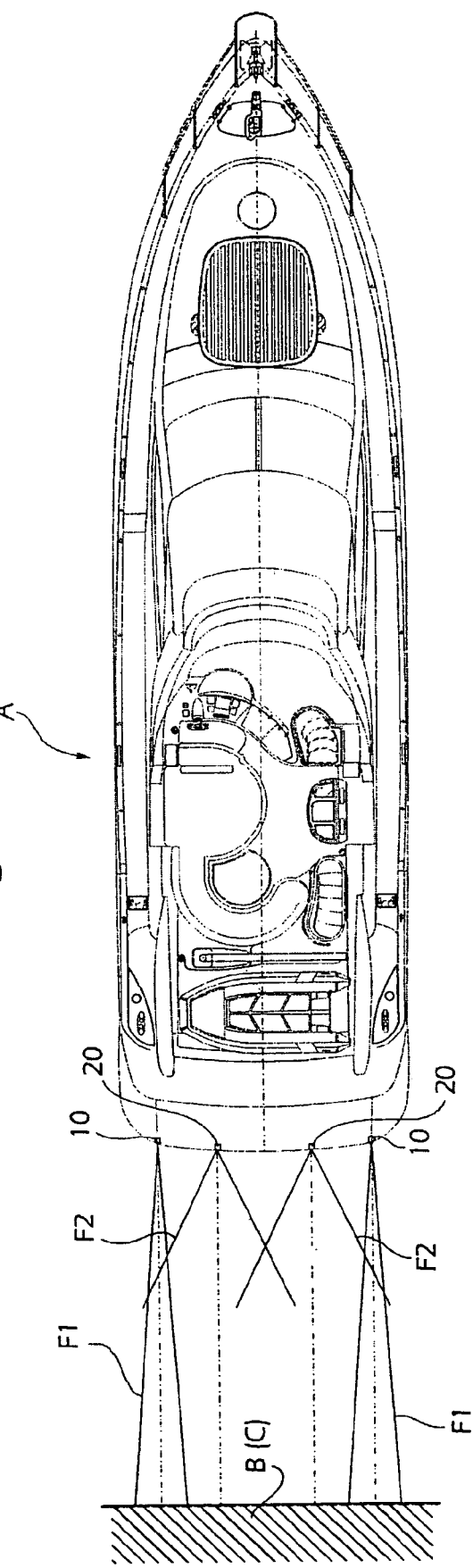
FIG. 5 is a view from above of an alternative embodiment of the apparatus of the invention to that of FIG. 2.

In the example of FIG. 5, two series of long-range transmitter-receivers 10 are aligned vertically at the sides of the stern, while two short-range transmitter-receivers 20 are arranged in an intermediate position. Alternatively, a single short-range transmitter-receiver 20 could be installed in a central position (as indicated 20'), provided this was able to emit a beam F2 with a beam angle β sufficiently wide as to leave no shadow region with respect to the beams F1 of the long-range transmitter-receivers 10.

Figure 4:
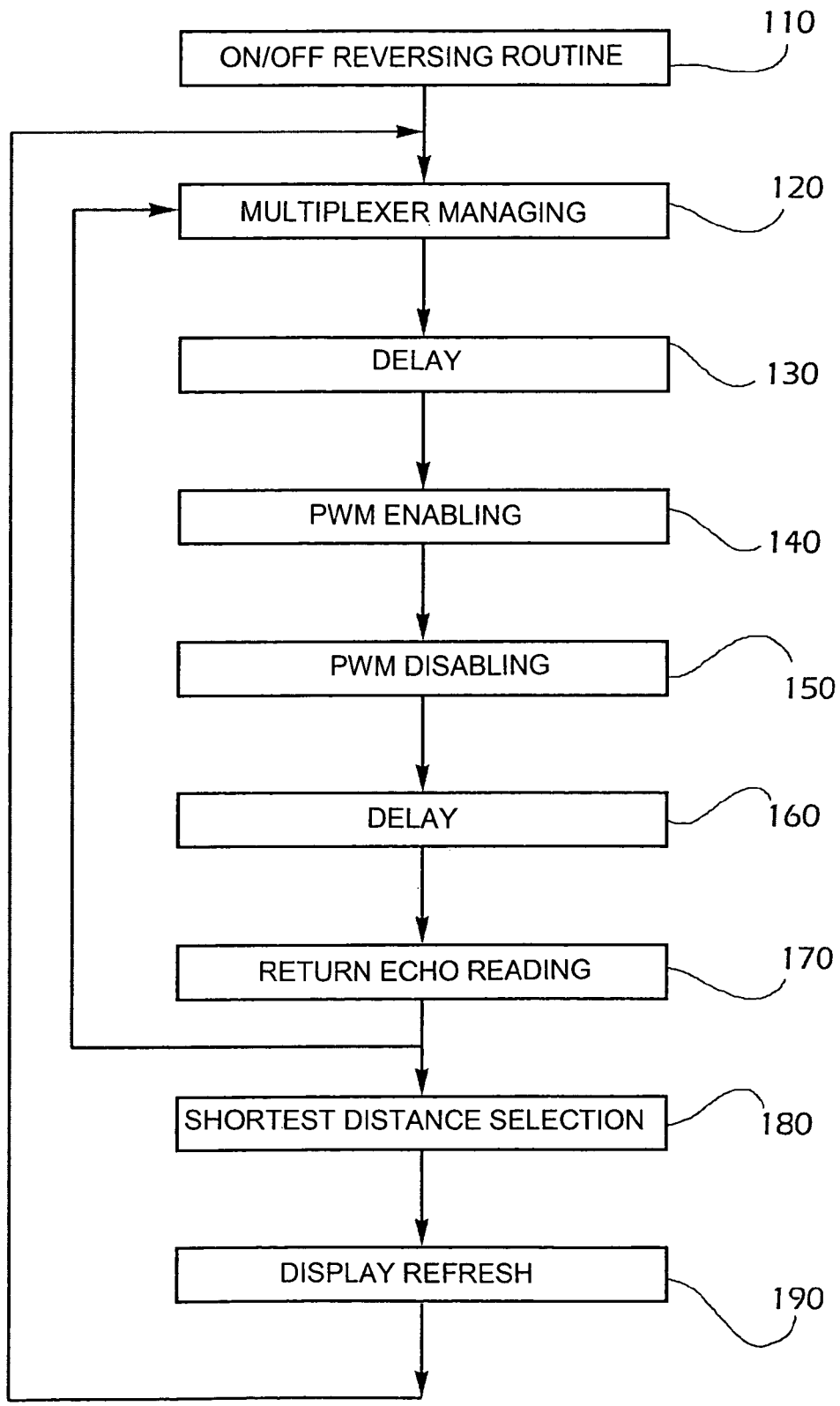
FIG. 4 is a flow diagram illustrating the operating cycle of the apparatus.

With reference now to the flow diagram of FIG. 4, an operating cycle will be described in summary explaining the management of the transmitter-receiver units and of data relating to signals receiver from the various units.

During the production or testing period, a programming routine is arranged whereby it is possible to access a protected area (EEPROM memory area) and input/modify the calibration/selection parameters for various functions mentioned in the diagram.

The step 110 indicates a reversing routine for managing the activation and deactivation (ON/OFF) of a reversing light on the onboard instrument panel; this routine activates the apparatus of the invention.

The step 120 indicates a multiplexer routine for managing the transmitter-receivers 10, 20 which are activated or deactivated alternately in a cyclic manner; after each unit has been activated the steps described hereafter are carried out.

The step 130 indicates a first delay routine which introduces a minimum delay period for power to be recharged in a switching supply for cyclically managing the emissions of output signals (the reflections of which are subsequently detected).

The step 140 indicates a PWM enabling routine for generating (for a period defined in the EEPROM) an electrical signal (pulse train) with a frequency of around 50 kHz required by the electro-acoustic transducer.

The step 150 indicates disabling of the signal generated at step 140.

The step 160 indicates a second delay routine which must not be altered because as soon as the PWM is deactivated (step 150) a false echo generated by the transducer itself is detected; the transit time of the acoustic signal (for measuring the distance) will consequently begin at the end of this second delay period.

The step 170 indicates echo reading. This is the most important routine since this is how the distance of the vessel from the fixed obstacle is calculated, on the basis of transit time, which can vary in dependence on the reversing speed of the vessel and on the number of samples taken in unit time. The shape of the wave (echo) which is detected then undergoes software filtering to eliminate or at least reduce interference. When an echo signal is detected, a series of minimum samples is taken, by emitting a certain number of pulses and awaiting their echo. If the frequency of the echo signals corresponds to that of the pulses emitted, the transit time is validated; if not, the previously detected echo signal detected is treated as disturbance and ignored. Naturally parameters such as times, delays, sampling and software filters are definable in EEPROM.

Steps 120 to 170 are repeated for each transmitter-receiver.

Step 180 indicates a shortest distance selection routine. In this routine, data detected from the respective transmitter-receivers are compared and the shortest distance data is selected.

Step 190 indicates refreshing of the display, whereby the central processing unit transmits the data detected as the shortest distance to the visual display unit by means of a serial system "485".

Steps 120 to 190 are repeated in succession until the reversing operation is completed.

The invention is naturally not limited to the embodiments described and illustrated here, which should be seen as non-limitative examples of the apparatus; modifications may be made to the shape and arrangement of parts and to manufacturing and operating details, without departing thereby from the scope of the invention. For example, it is possible to use transmitter-receiver units 10, 20 operable to emit beams F1, F2 of a shape other than circular-conical, with different beam angles both in the vertical and in the horizontal planes. In particular, long-range transmitter-receivers 10 could be used that have a wider beam angle of in the vertical plane, and short-range transmitter-receivers 20 that have a wide beam angle in the horizontal plane.

Finally, in yet another embodiment, only long-range transmitter-receivers 10 could be used, fitted on the stern of the vessel and aligned both vertically and horizontally. A first series of units 10 could be aligned along a vertical, longitudinal centreline, for example, with a second series of units 10 aligned in a horizontal plane, in a configuration generally resembling an inverted T. The spacing between units and the beam angle of the beams must of course be selected so as to include substantially all the area behind the stern in the overall field of view.

What is claimed is:

1. Apparatus for measuring the instantaneous distance between the stern of a vessel and a fixed structure such as a quay, jetty, landing stage or the like, during a reversing operation for docking alongside the fixed structure, comprising:
   a plurality of transmitter-receiver means for emitting acoustic signals in the form of beams rearwardly from the stern and for receiving acoustic signals reflected by the fixed structure, wherein the number of transmitter-receiver means and the angle of aperture of the respective beams are such that their overall field of view includes substantially all the area behind the stern, and wherein each transmitter-receiver includes transducer means operable to convert first input electrical signals into output acoustic signals and to convert reflected acoustic signals into second electrical signals to supply to electronic processing means;
   electronic processing means coupled electrically to the transmitter-receiver means for
      supplying the first electrical signals cyclically to the transducer means,
      receiving the second electrical signals converted from reflected acoustic signals, and
      determining the instantaneous distance between the vessel and the fixed structure on the basis of first and second electrical signals;
   visual and/or acoustic signalling means coupled to the electronic processing means for producing a visual and/or acoustic signal in real time indicating the determined instantaneous distance;
   at least one first long-range transmitter-receiver unit for emitting a first output acoustic signal in the form of a beam with a range of around 7–15 meters;
   at least one second short-range transmitter-receiver unit for emitting an output acoustic signal in the form of a beam with a beam angle greater than 20° and preferably of around 60–120 °;
   wherein the plurality of transmitter-receiver means comprise:
      a plurality of first long-range transmitter-receiver units, mounted aligned in at least one longitudinal vertical plane on the stern of the vessel, so as to direct rearwardly a corresponding plurality of first conical beams with substantially horizontal axes, parallel to one another in at least one longitudinal vertical plane; and
      a plurality of second short-range transmitter-receiver units mounted on the stern of the vessel and aligned in a horizontal plane so as to direct a corresponding plurality of second conical beams with substantially horizontal axes, parallel to one another in at least one substantially horizontal plane.

2. Apparatus according to claim 1, wherein the first transmitter-receiver unit is operable to emit a first output acoustic signal in the form of a beam with a narrow beam angles, of around 8–20°.

3. Apparatus according to claim 1, wherein the second transmitter-receiver unit is operable to emit a second output acoustic signal in the form of a beam with a short-range of around 1–2 meters.

4. Apparatus according to claim 1, wherein the first long-range transmitter-receiver units are mounted aligned in a longitudinal vertical plane passing through the centre line of the vessel.

5. Apparatus according to claim 1, wherein the second short-range transmitter-receiver units are mounted to the side of the first units.

6. Apparatus according to claim 1, including:
   a first series of long-range transmitter-receiver units mounted on the stern of the vessel and spaced vertically, and
   a second series of long-range transmitter-receiver units mounted on the stern of the vessel and spaced laterally.

7. Apparatus according to claim 6, including:
   a first series of long-range transmitter-receiver units aligned along a central longitudinal vertical plane, and
   a second series of long-range transmitter-receiver units aligned in a horizontal plane.

8. Apparatus according to claim 1, wherein the transmitter-receiver units include at least one transmitter-receiver operable to emit an output acoustic signal in the form of a conical beam.

9. Apparatus according to claim 1, wherein the transmitter-receiver units include at least one transmitter-receiver operable to emit an output acoustic signal in the form of a beam with different beam angles in the vertical plane from the horizontal plane.

10. Apparatus according to claim 9, in which the transmitter-receiver units include at least one long-range transmitter-receiver unit operable to emit an acoustic signal in the form of a beam with a wider beam angle in a vertical plane and a narrower beam angle in a horizontal plane.

11. Apparatus according to claim 1, wherein the transmitter-receiver units are operable to emit acoustic signals in the form of beams in configuration which is symmetrical relative to a longitudinal vertical plane passing through the centreline of the vessel.

12. Apparatus for measuring the instantaneous distance between the stern of a vessel and a fixed structure such as a quay, jetty, landing stage or the like, during a reversing operation for docking alongside the fixed structure, the apparatus comprising:
   a plurality of transmitter-receiver means for emitting acoustic signals in the form of beams rearwardly from the stern and for receiving acoustic signals reflected by the fixed structure, wherein the number of transmitter-receiver means and the angle of aperture of the respective beams are such that their overall field of view includes substantially all the area behind the stern, and wherein each transmitter-receiver includes transducer means operable to convert first input electrical signals into output acoustic signals and to convert reflected acoustic signals into second electrical signals to supply to electronic processing means;
   electronic processing means coupled electrically to the transmitter-receiver means for
      supplying the first electrical signals cyclically to the transducer means,
      receiving the second electrical signals converted from reflected acoustic signals, and
      determining the instantaneous distance between the vessel and the fixed structure on the basis of first and second electrical signals;
   visual and/or acoustic signalling means coupled to the electronic processing means for producing a visual and/or acoustic signal in real time indicating the determined instantaneous distance;

at least one first long-range transmitter-receiver unit for emitting a first output acoustic signal in the form of a beam with a range of around 7–15 meters; and at least one second short-range transmitter-receiver unit for emitting an output acoustic signal in the form of a beam with a beam angle greater than 20° and preferably of around 60–120°;

at least one short-range transmitter-receiver unit mounted on the stern of the vessel for directing at least one second output acoustic signal reearwardly in the form of a beam with a beam angle greater than 20° along a rearward longitudinal path, and a first and a second series of first long-range transmitter-receiver units, mounted on the stern of the vessel aligned in two longitudinal vertical planes, to either side of the second unit so as to direct rearwardly two corresponding series of first conical beams with substantially horizontal axes, parallel to one another in the longitudinal vertical planes.

* * * * *